(12) United States Patent
Kudo et al.

(10) Patent No.: US 7,644,265 B2
(45) Date of Patent: Jan. 5, 2010

(54) CONTENT TRANSMITTING DEVICE, CONTENT RECEIVING DEVICE AND CONTENT TRANSMITTING METHOD

(75) Inventors: Yoshimichi Kudo, Fujisawa (JP); Manabu Sasamoto, Yokohama (JP); Hiroo Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 708 days.

(21) Appl. No.: 10/770,519

(22) Filed: Feb. 4, 2004

(65) Prior Publication Data

US 2004/0268131 A1 Dec. 30, 2004

(30) Foreign Application Priority Data

Jun. 10, 2003 (JP) ............................. 2003-164516

(51) Int. Cl.
*H04L 29/06* (2006.01)
(52) U.S. Cl. ...................................................... 713/150
(58) Field of Classification Search .................. 713/150
See application file for complete search history.

(56) References Cited

U.S. PATENT DOCUMENTS

| 5,319,705 | A |   | 6/1994  | Halter et al.        |         |
|-----------|---|---|---------|----------------------|---------|
| 5,708,713 | A | * | 1/1998  | Harte ...............  | 713/169 |
| 5,715,403 | A |   | 2/1998  | Stefik               |         |
| 5,850,449 | A | * | 12/1998 | McManis .............  | 713/161 |
| 5,878,034 | A | * | 3/1999  | Hershey et al. .......  | 370/321 |
| 6,058,476 | A |   | 5/2000  | Matsuzaki et al.     |         |
| 6,282,653 | B1|   | 8/2001  | Berstis et al.       |         |
| 6,434,478 | B1| * | 8/2002  | Ikeda ................  | 701/200 |
| 6,505,032 | B1| * | 1/2003  | McCorkle et al. .....  | 455/41.2|
| 6,538,558 | B2|   | 3/2003  | Sakazume et al.      |         |
| 6,629,246 | B1| * | 9/2003  | Gadi .................  | 726/8   |
| 6,684,254 | B1| * | 1/2004  | Dutta ................  | 709/229 |
| 6,782,260 | B2|   | 8/2004  | Nakakita et al.      |         |
| 7,058,414 | B1| * | 6/2006  | Rofheart et al. .....  | 455/456.4|
| 7,287,282 | B2|   | 10/2007 | Yamada et al.        |         |
| 2002/0027992 | A1 | * | 3/2002 | Matsuyama et al. ...  | 380/231 |

(Continued)

FOREIGN PATENT DOCUMENTS

CN 1170995 1/1998

(Continued)

OTHER PUBLICATIONS

"5C Digital Transmission Content Protection White Paper" by five companies including Hitachi, Ltd., et al., Pub. Date Jul. 14, 1998.

(Continued)

*Primary Examiner*—Kambiz Zand
*Assistant Examiner*—Teshome Hailu
(74) *Attorney, Agent, or Firm*—Antonelli, Terry, Stout & Kraus, LLP.

(57) ABSTRACT

Before content transmission, the content transmitting device and the content receiving device mutually authenticate each other to verify that the other device respects copyright and rightfully handles content, and then content is encrypted by shared key data and transmitted. It is arranged that in an authentication process, a time from transmission of an authentication request or a time from transmission of an authentication response until arrival of receipt acknowledgement data is measured and only when a measured time is less than a fixed upper-limit value, content is transmitted.

13 Claims, 6 Drawing Sheets

U.S. PATENT DOCUMENTS

| | | | |
|---|---|---|---|
| 2002/0059614 A1* | 5/2002 | Lipsanen et al. | 725/75 |
| 2002/0061748 A1 | 5/2002 | Nakakita et al. | |
| 2002/0156705 A1* | 10/2002 | Koyata et al. | 705/27 |
| 2003/0018751 A1* | 1/2003 | Lee et al. | 709/219 |
| 2003/0046541 A1 | 3/2003 | Gerdes et al. | |
| 2003/0061165 A1 | 3/2003 | Okamoto et al. | |
| 2003/0226011 A1* | 12/2003 | Kuwano et al. | 713/155 |
| 2004/0076294 A1 | 4/2004 | Shibata et al. | |
| 2004/0098583 A1 | 5/2004 | Weber | |
| 2004/0193881 A1 | 9/2004 | Ayaki et al. | |
| 2004/0268131 A1 | 12/2004 | Kudo et al. | |
| 2005/0027984 A1 | 2/2005 | Saito et al. | |
| 2005/0160265 A1 | 7/2005 | Tanaka et al. | |
| 2005/0160274 A1 | 7/2005 | Yukimatsu et al. | |
| 2005/0210290 A1 | 9/2005 | Ono et al. | |
| 2006/0265735 A1 | 11/2006 | Ohno | |

FOREIGN PATENT DOCUMENTS

| | | |
|---|---|---|
| CN | 1392706 | 1/2003 |
| CN | 1574726 | 2/2005 |
| EP | 1 143 656 | 11/2004 |
| JP | 10-051439 | 2/1998 |
| JP | 10-271154 | 10/1998 |
| JP | 2000-287192 | 10/2000 |
| JP | 2001-358706 | 12/2001 |
| JP | 2002-229950 | 8/2002 |
| JP | 2005-45756 | 2/2005 |
| KR | 10-2001-0004137 | 1/2001 |
| KR | 2001-4137 | 1/2001 |
| KR | 2001-0004137 | 1/2001 |
| KR | 10-2002-0063659 | 8/2002 |
| KR | 2002-0063659 | 8/2002 |
| KR | 2002-0019575 | 10/2003 |
| WO | WO 01/93580 | 12/2001 |
| WO | WO 02/030054 | 4/2002 |

OTHER PUBLICATIONS

5C Digital Transmission Content Protection White Paper, Revision 1.0, Jul. 14, 1998, pp. 1-13.

Bie Zujie, Online Life, Network Speed Testing, pp. 1-3, w/ translation.

Douglas E. Comer, Computer Networks and Internets with Internet Applications, Third Edition, pp. 361-372.

Menezes et al., Handbook of Applied Cryptography. CRC Press, 1997, pp. 397-405.

* cited by examiner

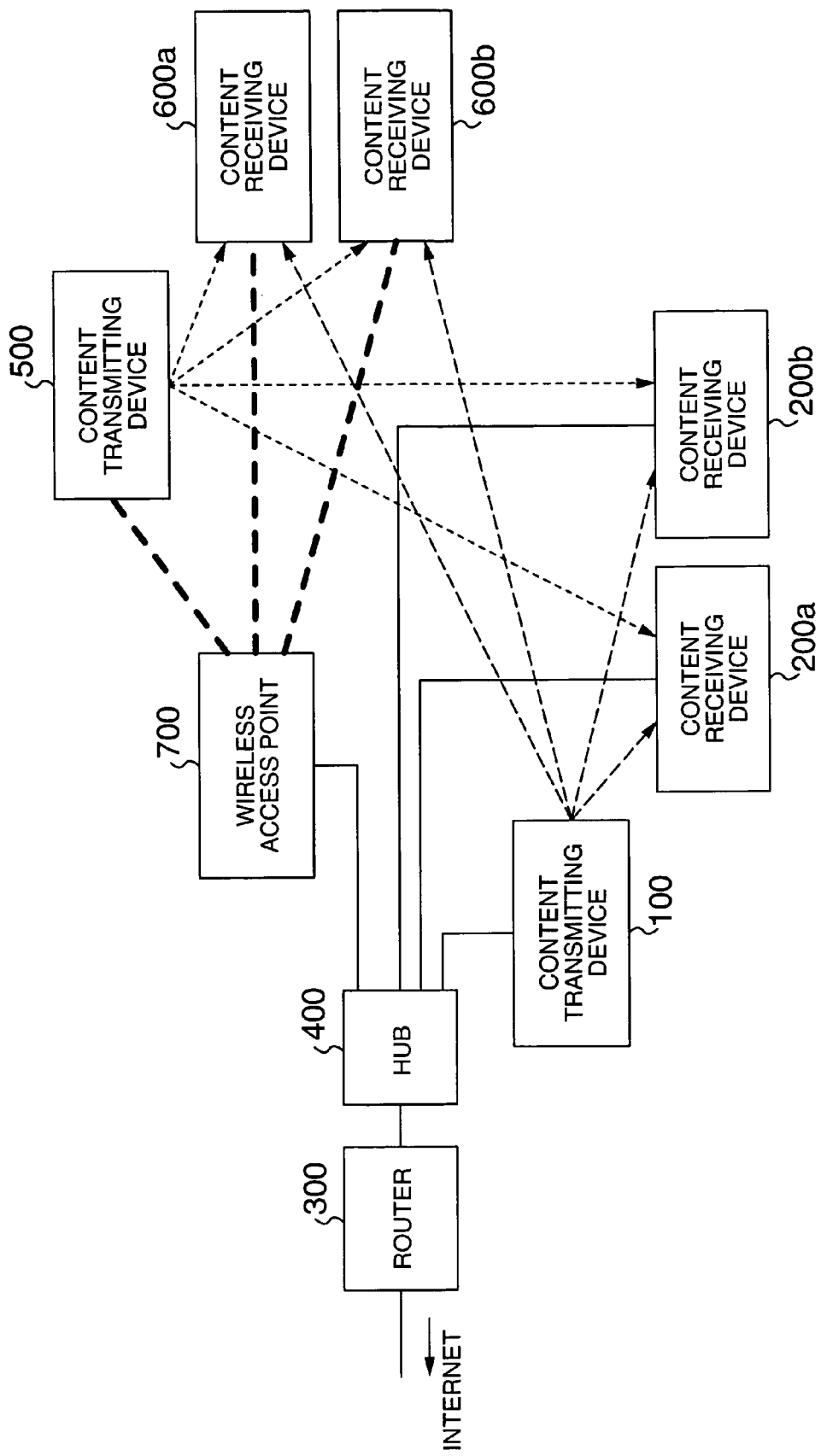

CONTENT TRANSMITTING DEVICE, CONTENT RECEIVING DEVICE AND CONTENT TRANSMITTING METHOD

BACKGROUND OF THE INVENTION

The present invention relates to a transmitting device, a receiving device and a contents transmitting method suitable to protect copyrights of contents to be transferred, when information, such as contents which include images and sound, is transmitted and received via a network.

With the growth of the processing power such as computing speed and storage capacity of personal computers (hereafter referred to as PC), there has been a significant increase in the capacity of the hard disc drives (hereafter referred to as HDD) mounted in the PC. Under the circumstances, even with PCs of levels for general household use, it has become possible to record TV programs and watch them on the PC screen.

Meanwhile, in the trend of lowering price of large-capacity HDDs, HDD-mounted video recording equipment for household use came on to the market, which has a built-in HDD and digitally records video and audio information, and its improved usability owing to use of discs as recording media has been drawing attention.

In HDD-mounted video recording equipment and PCs for video recording as mentioned above, information such as images and sound is recorded in the HDD fixed in the system. Therefore, when a user wants to watch the recorded program in another place in the house, it is necessary to convey the whole HDD-mounted equipment to another place. For this reason, the difficulty has been felt in realizing the portability of HDD video recorders unlike with the VTR recorders which provide the excellent portability of audio-visual information on medium level; moreover, a number of VTR recording/playback units using replaceable media can be provided at a less-expensive cost.

Therefore, it has been contemplated to make it possible to play back audio-visual information anywhere in one's house by mounting an interface to wired/wireless LAN (Local Area Network) in the video recorder and transmitting signals over a network to another PC or receiving device.

As means for protecting copyrights of information, such as contents, there is the Digital Transmission Content Protection (DTCP) specification which defines a cryptographic protocol for protection on digital buses of the IEEE 1394 standard as described in "5C Digital Transmission Content Protection White Paper" by five companies including Hitachi, Ltd., et al., which is an example of the method for protecting illegal copying and the like on digital AV devices.

A number of techniques have been disclosed to realize protection from illegal copying, intercepting and tampering to thereby protect copyrights as information traverses between devices or between networks, two examples of which are disclosed in JP-A-2000-287192 and JP-A-2001-358706.

In the prior art mentioned above, more specifically, in a case where an interface to wired/wireless LAN is mounted in a home video recorder, and a content is transmitted to another PC or receiving device via a network to enable visual-audio information to be reproduced anywhere in the house, consideration has not been taken about protection of copyrights of visual-audio information (hereafter referred to as content) which should receive copyright protection, and visual-audio information recorded in the HDD could further be stored in the HDD in another PC that received the information via a LAN, and visual-audio information that could be handled had to be "copy-freely" content which was freely copyable.

When a digitally recorded content is transmitted from one device to another via a network as mentioned above, data being transferred is less susceptible to quality deterioration and a copy (duplicate) of the same quality as the content in the device on the transmitter side can generally be produced on the receiver's side. Therefore, it is necessary to take consideration for the prevention of illegal copying of content that deviates from the range of personal use to visual or audio data (hereafter referred to as content) the copyright of which should be protected. For example, when a content is transmitted between AV devices, the content is encrypted on the content transmitting device's side, and information for decryption is shared with the receiving device's side in order to prevent the content from being correctly received and decrypted by any device other than the content receiving device as the legitimate destination, by which copy protect is implemented to thereby prevent unrestricted copying.

An example of copy protect method adopted in digital AV devices is the DTCP method described in 5C Digital Transmission Content Protection White Paper. In the DTCP method, contents are classified into "copy-freely", "copy-one-generation", and "copy-never" contents and managed accordingly, and the video recorder records only "copy-freely" and "one-copy-generation" contents, and treats the "copy-one-generation" content which it has recorded once as a "no-more-copies" content, and the contents are subjected to an encryption process on the transmitter side except for "copy-freely" contents and transmitted on the buses, thereby preventing unrestricted copying of contents.

Also for transmission on a wired or wireless LAN, there have been disclosed some techniques, based on a similar viewpoint as in the DTCP method, for realizing the copy protect to protect copyrights. For example, JP-A-2000-287192 discloses a technique for applying a method similar to DTCP to a copy protect system in distribution of digital contents on the network, and likewise JP-A-2001-35706 discloses a technique for making a configuration between devices which communicate contents in encrypted form for copyright protection.

In these, no consideration is taken as to whether the transmitter and the receiver are located within a same house when contents are transmitted via a wired or wireless LAN. In a case where content is downloaded from a distribution server, it is quite usual that the transmitter side is in a provider site and the receiver side is in the house of user, for example.

Therefore, when some one is going to record a content by the HDD of a PC or a HDD video recorder and transmit to another device in the family, assuming that the above-mentioned technique is used, if the LAN in the family is connected to the Internet, the content can be received by the receiving devices located in other families connected via the Internet, and can be displayed on the monitor screens, and the range of communication extends to any places throughout the world so long as they are connected to the Internet.

Under the present state of affairs, even if one wants to carry out copy protect by the above techniques, when the user of the video recorder makes the video recorder accessible through the Internet, any receiving device furnished with the above-mentioned copy protect function can receive content and the content can be displayed on the screen, resulting in a great deviation from the range for personal use, which is the intended purpose of copyright protection.

SUMMARY OF THE INVENTION

The object of the present invention to provide a content and information transmitting device and a corresponding receiving device, and a content transmitting method which can implement copy protection to prevent illegal duplication of contents when transmitting contents via a wired or wireless LAN located in a family and restrict the legitimate viewing and duplication of contents to the range of personal use.

To solve the above problem, the present invention adopts the following structures. According to a first aspect of he present invention, a content transmitting device for transmitting a content via a LAN, which comprises send-content generating means for supplying the network communication device with a content to be transmitted to a content receiving device connected via the LAN; authenticating means for receiving an authentication request from the content receiving device and authenticating the authentication request, and issuing in return an authentication request to the content receiving device; encrypting means for generating key information by key information generated based on information obtained by performing an authentication process by the authenticating means, and carrying out an encryption process of a content to be transmitted to the content receiving device, by using the key information; timer means for measuring a time from transmission of an authentication request to the content receiving device or a time from transmission of a response to the authentication request from the content receiving device until arrival of acknowledgement of receipt from the content receiving device, wherein when a measured result by the timer means is larger than a predetermined value, the content is not transmitted to the content receiving device.

Moreover, in the above-mentioned content transmitting device, when the measured time by the timer means from transmission of the authentication request to the content receiving device until arrival of acknowledgement of receipt by the content receiving device is larger than a predetermined value, the authenticating means decides that the authentication of the content receiving device is a failure.

According to a second aspect of the present invention, a content receiving device for receiving a content via a LAN comprises network communication process means for transmitting and receiving data over a network; content receiving process means for receiving from the network communication process means a content transmitted by a content transmitting device connected via the network; authenticating means for issuing an authentication request to the content transmitting device and making a pass/failure decision on authentication of the authentication request received from the content transmitting device; decrypting means for generating key information by key information generated based on information obtained by performing an authentication process by the authenticating means, and performing a decryption process of a content from the content transmitting device by using the key information; and timer means for measuring a time from transmission of an authentication request to the content transmitting device or a time from transmission of a response to the authentication request of the content transmitting device until arrival of acknowledgement of receipt from the content transmitting device, wherein when a measured result by the timer means is larger than a predetermined value, the content is not received from the content transmitting device.

Moreover, in the above-mentioned content receiving device, a measured result at the timer means of measuring a time from when the authentication request is transmitted to the content transmitting device until the arrival of acknowledgement of receipt from the content transmitting device is larger than a predetermined value, the authenticating means decides that the authenticating means decides that the authentication of the content transmitting device is a failure.

In a third aspect of the present invention, a content transmitting device comprises network communication process means for transmitting and receiving data via a network; send-content generating means for supplying the network communication device with a content to be transmitted to a content receiving device; authenticating means for receiving an authentication request from the content receiving device and authenticating the authentication request, and issuing in return an authentication request to the content receiving device; encrypting means for generating key information by key information generated based on information obtained by performing an authentication process by the authenticating means, and carrying out an encryption process of a content to be transmitted to the content receiving device, by using the key information; timer means for measuring a time from transmission of an authentication request to the content receiving device or a time from transmission of a response to the authentication request from the content receiving device until arrival of acknowledgement of receipt from the content receiving device; and A content receiving device comprises network communication process means for transmitting and receiving data over a network; content receiving process means for receiving from the network communication process means a content transmitted by a content transmitting device; authenticating means for issuing an authentication request to the content transmitting device and making a pass/failure decision on authentication of the authentication request received from the content transmitting device; decrypting means for generating key information by key information generated based on information obtained by performing an authentication process by the authenticating means, and performing a decryption process of a content from the content transmitting device by using the key information; and timer means for measuring a time from transmission of an authentication request to the content transmitting device or a time from transmission of a response to the authentication request of the content transmitting device until arrival of acknowledgement of receipt from the content transmitting device, wherein a measured result by the timer means of the content transmitting device or a measured result by the timer means of the content receiving device is larger than a predetermined value, the content transmitting device does not transmit a content to the content receiving device.

Other objects, features and advantages of the invention will become apparent from the following description of the embodiments of the invention taken in conjunction with the accompanying drawings.

BRIEF DESCRIPTION OF THE DRAWINGS

FIG. 6 is a block diagram of a LAN formed by the content transmitting device and the content receiving device according to the first and second embodiments of the present invention.

DESCRIPTION OF THE EMBODIMENTS

Embodiments of the present invention will be described in the following.

Figure 1:
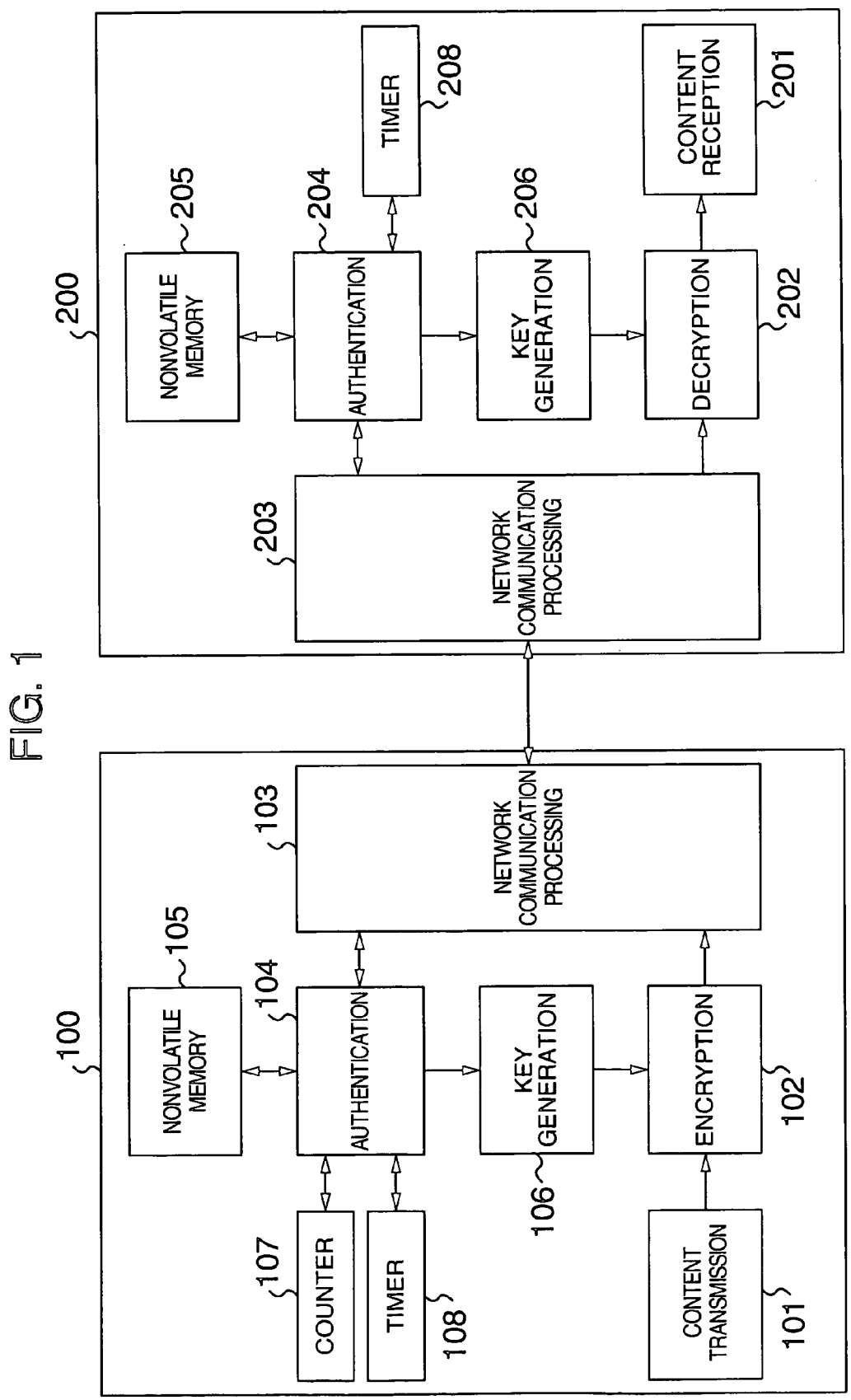
FIG. 1 is a block diagram showing the structure of a content transmitting device and a content receiving device according to a first embodiment of the present invention.

FIG. 1 is a block diagram showing the structure of a content transmitting device 100 and a content receiving device 200 according to a first embodiment of the present invention, and the content transmitting device 100 and the content transmitting device are connected together via a LAN.

The content transmitting device 100 comprises a content transmitting circuit 101 for transmitting a content to the content receiving circuit 200 via a LAN; an encryption circuit 102 for encrypting a content output from the content transmitting circuit 101; a network communication process circuit 103 for receiving output data of the encryption circuit 102 and exchanging data with an authentication circuit 104, and exchanging data with other devices via the LAN; an authentication circuit 104 for mutual authentication with other devices by exchanging information with the other devices connected to the LAN; a non-volatile memory 105 for storing information necessary for processing in the authentication circuit 104; a key generating circuit 106 for generating key information necessary for content encryption in the encryption circuit 102 on the basis of information output from the authentication circuit 104; a counter circuit 107 for measuring and holding the number of successful mutual authentications in the authentication circuit 104; and a timer circuit 108 for measuring a time from transmission of information such as an authentication request generated by the authentication circuit 104 to another device until arrival of acknowledgement of receipt of the information. Contents transmitted by the content transmitting circuit 101 are not limited to specific kinds of contents, but contents can be all kinds of information, including image and sound data of programs received from TV broadcast, and image and sound data reproduced from recording media, such as tape, HDDs, DVDs and other discs.

In FIG. 1, a tuner for receiving broadcast, means for video recording and playback, and a data compression circuit required before transmission over networks are omitted from illustration. Those means may be added as one thinks fit according to the kind of content to be transmitted. Contents transmitted from the content transmitting circuit 101 to the content receiving device 200 are marked with copy protection statuses: "copy-freely", "copy-one-generation", "copy-never", or "no-more-copies".

The content receiving device 200 comprises a content receiving circuit 201 for receiving content coming in via the LAN; a decryption circuit 202 for receiving contents encrypted by the encryption circuit 102 of the content transmitting device 100 from a network communication process circuit 203 and decrypting and outputting the contents to the content receiving circuit 201; the network communication 203 for receiving data from other devices through the LAN and sending it to the decryption circuit 202 and exchanging data with an authentication circuit 204; the authentication circuit 204 for mutual authentication with other devices by exchanging information the other devices; a non-volatile memory 205 for storing information necessary for processing in the authentication circuit 204; a key generating circuit 206 for generating key necessary for content decryption in the decryption circuit 202 on the basis of information output from the authentication circuit 204; and a timer circuit 208 for measuring a time from transmission of information such as an authentication request from the authentication circuit 204 to another device until arrival of acknowledgement of receipt of the information. Image and sound data output from the content receiving circuit 201 are diverse in their modes of use, such as are displayed on display units or recorded in recording media like discs and tape, and their modes of use of the present invention are not limited to specific forms.

In FIG. 1, means for display and video recording and means for expanding/recovering compressed contents received are omitted, but they may be added according to the mode of use of received contents if they are necessary. Received contents are processed according to the identification code indicating status of copy protection, such as "copy-freely", "copy-one-generation", "copy-never", and "no-more copies" sent out with contents; for example, contents marked "copy-freely" or "copy-one-generation" may be recorded on recording media and contents marked "copy-one-generation", after recorded once, are thereafter treated as "no-more-copies" contents.

Figure 2:
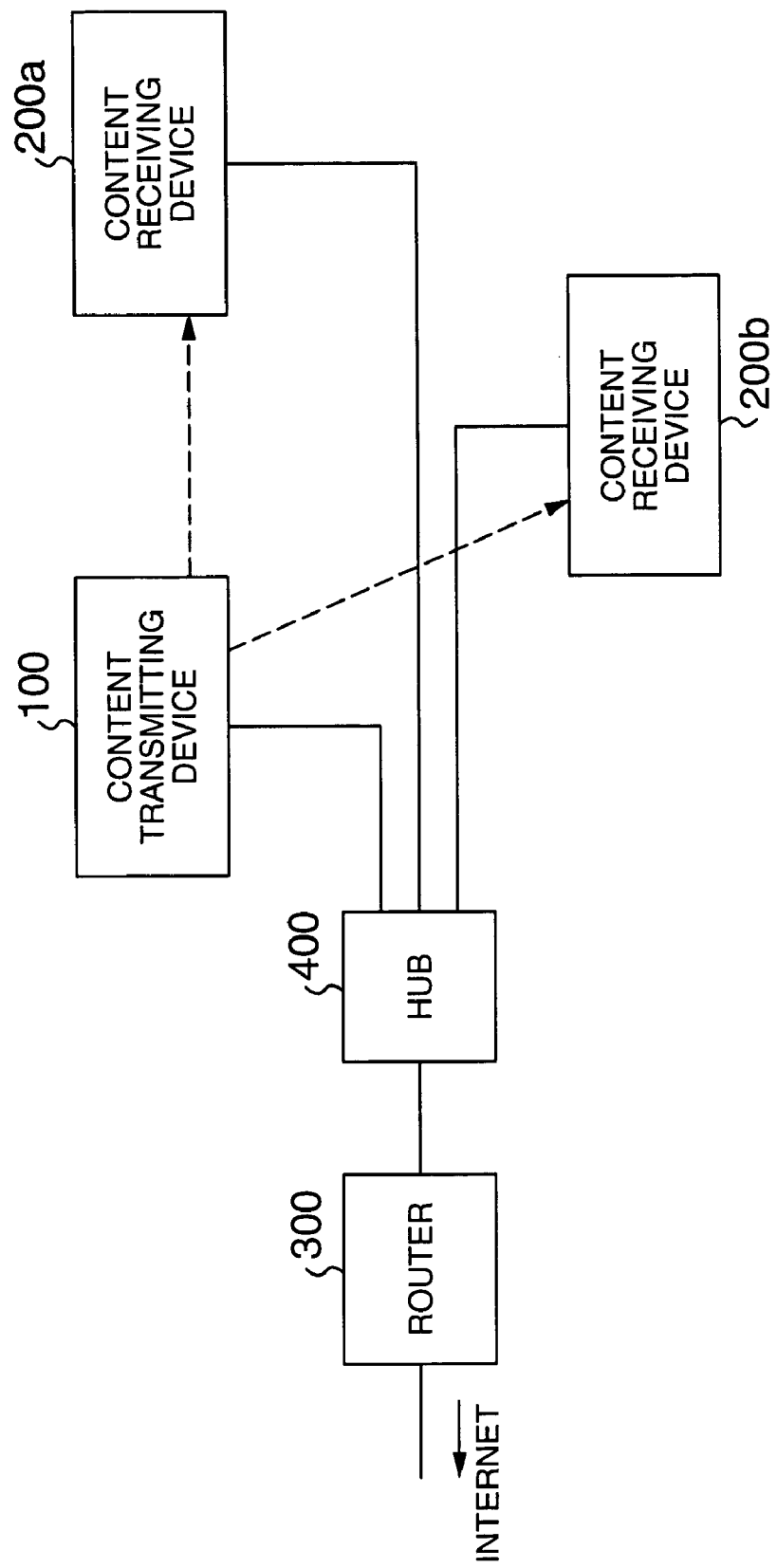
FIG. 2 is a block diagram of a LAN formed by a content transmitting device and a content receiving device in the first embodiment of the present invention.

FIG. 2 shows a structural example of a LAN including a content transmitting device 100 and a content receiving device 200. One content transmitting device 100 and two content receiving devices 200a and 200b are connected to a network hub device 400 by a wired LAN, and the network hub device is further connected to a router 300. The router 300 is connected to the Internet via a modem or an opto-electric converter or via a modem not illustrated or to an opto-electric converter built in the router.

The above-mentioned connection to the Internet may be made by ADSL (Asymmetric Digital Subscriber Line), high-speed access line, such as optical fiber, ISDN (Integrated Services Digital Network), analog telephone line, mobile communication network, such as cellular phone network or any other kinds. The dotted lines in FIG. 2 indicate devices for transmitting and receiving contents and their directions.

The structure of LAN in FIG. 2 shows only an example; therefore, three or more content receiving devices may be connected. On the other hand, two or more content transmitting devices may be connected. In this case, each content transmitting device can simultaneously transmit different contents to the content receiving device as long as the bandwidth of the LAN permits to transmit the contents.

The content transmitting device 100, the content receiving devices 200a, 200b, and a router 300 are each assigned an IP address. The interface part of each network communication process circuit is assigned a 48-bit MAC (Media Access Control) address when it leaves the factory. When DHCP (Dynamic Host Configuration Protocol), which is extensively adopted for automatic allocation of addresses for clients on the Internet, is used to assign IP addresses to the devices, one need only to use the router 300 as a DHCP server and allocate IP addresses. In the case of IPv6, by using IPv6 stateless address autoconfiguration to generate addresses, each device can generate its own IP address by using high-order 64 bits of the IP address of the router 300 and the MAC address of its LAN board.

Figure 3:
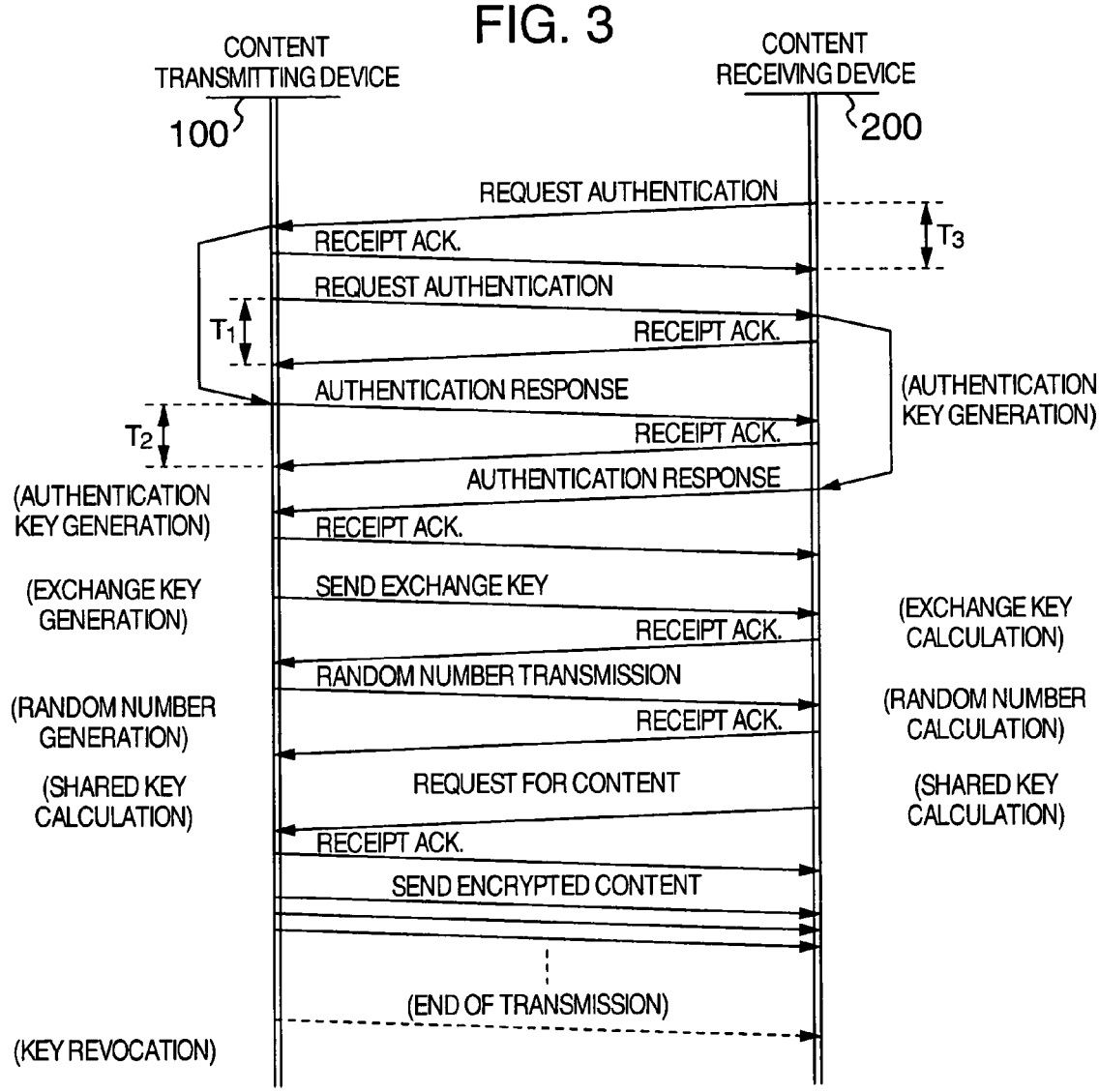
FIG. 3 is a sequence diagram showing a signature procedure for transmitting contents between the content transmitting device and the content receiving device according to the first embodiment of the present invention.

FIG. 3 shows an example of a procedure of transmitting and receiving contents by the content transmitting device 100 and the content receiving device 200. Shown on the left is the content transmitting device 100 and shown on the right is the content receiving device 200, and timing and direction of transmission and reception of information between those devices are indicated by the arrows.

Prior to transmission of content, the content transmitting device 100 and the content receiving device 200 authenticate each other, and after it has been confirmed that the devices of the other parties were manufactured correctly pursuant to rules of copyright protection, the content is transmitted. TCP protocol is used for information exchange for authentication, and when authentication requests are sent to the other parties and various items of information, such as authentication replies, are exchanged, acknowledgements of their receipt are returned from the other parties, and thus a communication path is secured which enables detection of transmission errors. In FIG. 3, data transmission and reception to establish or revoke a TCP connection are omitted.

To begin with, the content receiving device side 200 generates an authentication request. When an authentication request is sent to the content transmitting device 100, it is attached with a public key specific to the device, which is generated by a special certificate authority and held in a nonvolatile memory 205 of the content receiving device 200, accompanied with a certificate for the public key. The public key and the certificate are previously stored in the nonvolatile memory 205 when the content receiving device 200 is manufactured. When receiving the authentication request and sending a receipt acknowledgement to the content receiving device 200, the content transmitting device 100 generates an authentication request to send from its own side, and just as the content receiving device did, sends a public key specific to the content transmitting device 100, generated by a certificate authority, along with a certificate for the key and simultaneously starts a timer circuit 108 to measure time T1 from transmission of the authentication request until acknowledgement of receipt arrives from the content receiving device.

Meanwhile, the content transmitting device 100 authenticates the content receiving device 200 by a predetermined public key signing algorithm. When the numeric value on the counter 107 is checked and if the current value is over a predetermined value, the authentication is determined unsuccessful, and if the authentication is successful, the value on the counter 107 is incremented by 1. If the measured value T1 on the counter 108 is larger than a predetermined value, the authentication is determined unsuccessful. When the authentication is successful, an authentication response is issued and sent to the content receiving device 200. Similarly, on receiving the authentication request from the content transmitting device 100, the content receiving device 200 is subjected to authentication, and if the result is a "pass", an authentication response is issued and sent to the content transmitting device 100. If mutual authentication is successful as mentioned above, an authentication key common to both devices is generated and shared by them. To generate the authentication key, it is only necessary to use a well-known key exchange algorithm, such as Diffie-Hellmann key exchange.

When an authentication key for shared use is completed, the content transmitting device 100 generates an exchange key and a random number, and encrypts the exchange key and the random number separately by the authentication key, and sends them to the content receiving device 200. Note that though in FIG. 3 an exchange key and a random number are sent separately from the content transmitting device 100 to the content receiving device 200, but they may be sent together. In the content receiving device 200, the exchange key sent from the content transmitting device 10 is decrypted by using the authentication key and stored together with the random number that has been received and decrypted. Subsequently, a shared key is generated according to a predetermined computing algorithm by using the exchange key and the random number respectively in the content transmitting device 100 and the content receiving device 200.

Regarding the procedure of transmitting content, for example, as shown in FIG. 3, the content receiving device 200 should send a request for content to the content server 100 as a trigger action of content transmission. It may be arranged such that when content has been transmitted, the content transmitting device 100 sends a message indicating the end of transmission or otherwise the content receiving device 200 sends a request to end the transmission. If the amount of data to be transmitted is previously known, it is not necessarily required to notify the other party of the end of transmission. When the transmission of all the required content has been completed, the content transmitting device 100 revokes the authentication key, the exchange key, the random number, and the shared key. It is possible to arrange for the content receiving device 200 to also revoke the authentication key, the exchange key, the random number, and the shared key when it has completed receiving the content, and when it is going to receive content again, the content receiving device 200 has only to start with issuing an authentication request. If the content transmitting device 100 is transmitting content to another content receiving device and it is possible to use the previously-used keys again, the content receiving device, the content receiving device 200 may ask the content transmitting device 100 for information about the current keys and use the keys used previously.

The protocol used to transmit content from the content transmitting device 100 to the content receiving device 200 is not limited to a specific one, but other protocols, such as RTP, HTTP, and ftp (File Transfer Protocol) as mentioned before, can be used. To transmit content, it is only necessary to place content, encrypted by an algorithm predetermined by using a shared key, into the payload field of each transfer protocol when the content is transmitted. As the encryption algorithm, the M6 cryptograph adopted in DTCP may be used, for example.

As has been described, because contents encrypted by using a shared key for encryption are exchanged between the content transmitting device 100 and the content receiving device 200 as shown in FIG. 1, even if content is received by some other device on the LAN, the content cannot be decrypted correctly, thus making it possible to prevent the content from being copied illegally by the user.

As shown in FIG. 2, it is possible for two or more content receiving devices to receive content simultaneously. In this case, it is only necessary that the content receiving device and the content transmitting device authenticate each other by following the steps shown in FIG. 3 and then content is transmitted. In this process, the counter 107 counts the number of content receiving devices that are authenticated by the one content transmitting device; therefore, by setting an upper limit to the number of content receiving devices to be authenticated by the content transmitting device, it is possible to limit the number of copies of content that can be made by a plurality of content receiving devices. As for the upper limit number of content receiving devices, by following IEEE1394, for example, it is possible to set 62 as the upper limit number of content receiving devices that can be connected simultaneously or less than 62.

Further, if the content receiving device 200 is located in another person's house through the Internet away from the user's house, an authentication request is sent from the content transmitting device and acknowledgement of receipt is received through a wide area network and the router 300, message exchange takes longer than in transmission and reception within one house. In this regard, by setting an appropriate value, 10 ms for example, as the upper limit value by which to determine if a measured result of T1 is passable, it is possible to restrict the transmittable range of content to within the user's house.

In addition to taking into account the above-mentioned measured result of T1 in FIG. 3 in a pass/fail decision of authentication in the content transmitting device 100, it may be additionally arranged that by measuring by the timer 108 time T2 from when an authentication response is transmitted from the content transmitting device 100 until acknowledgement of receipt from the content receiving device 200 arrives as shown in FIG. 3, if the result is larger than a predetermined value, subsequent transmission of the exchange key and the random number is stopped to prevent content from being sent to the content receiving device 200. Or, the content receiving device 200 is authenticated by the content transmitting device 100 without taking into account the measured result of time T1, and a decision may be made based on measured values of both time T1 and time T2 whether or not to transmit the exchange key and the random number.

Similarly, it may be arranged that the content receiving device 200 measures time T3 from when an authentication request is sent to the content transmitting device 100 until acknowledgement of receipt arrives from the content transmitting device 100 and if the measured result is larger than a predetermined value, a decision is made that the result of the authentication of the content transmitting device 100 is a failure. By this arrangement, it is possible also for the content receiving device 200 to prevent content from being received from outside the house, that is, to prevent transmission of content that exceeds the range of personal use of content.

Moreover, it may also be arranged that when an authentication response to the authentication request from the content transmitting device 100 is transmitted to the content transmitting device 100, the measured result of time T3 in the content receiving device 200 is also sent so as to be used in the content transmitting device's making a decision whether or not to transmit content.

Further, it is possible to impose a restriction to prevent content reception from exceeding the range of personal use, for example by setting the lifetime "Time To Live" (TTL) of a TCP packet to transmit an authentication request or an authentication response to the request or content, or the time to live of an IP packet which contains a UDP datagram at 3 or less in order to prevent the authentication request from passing through the router 300.

Figure 4:
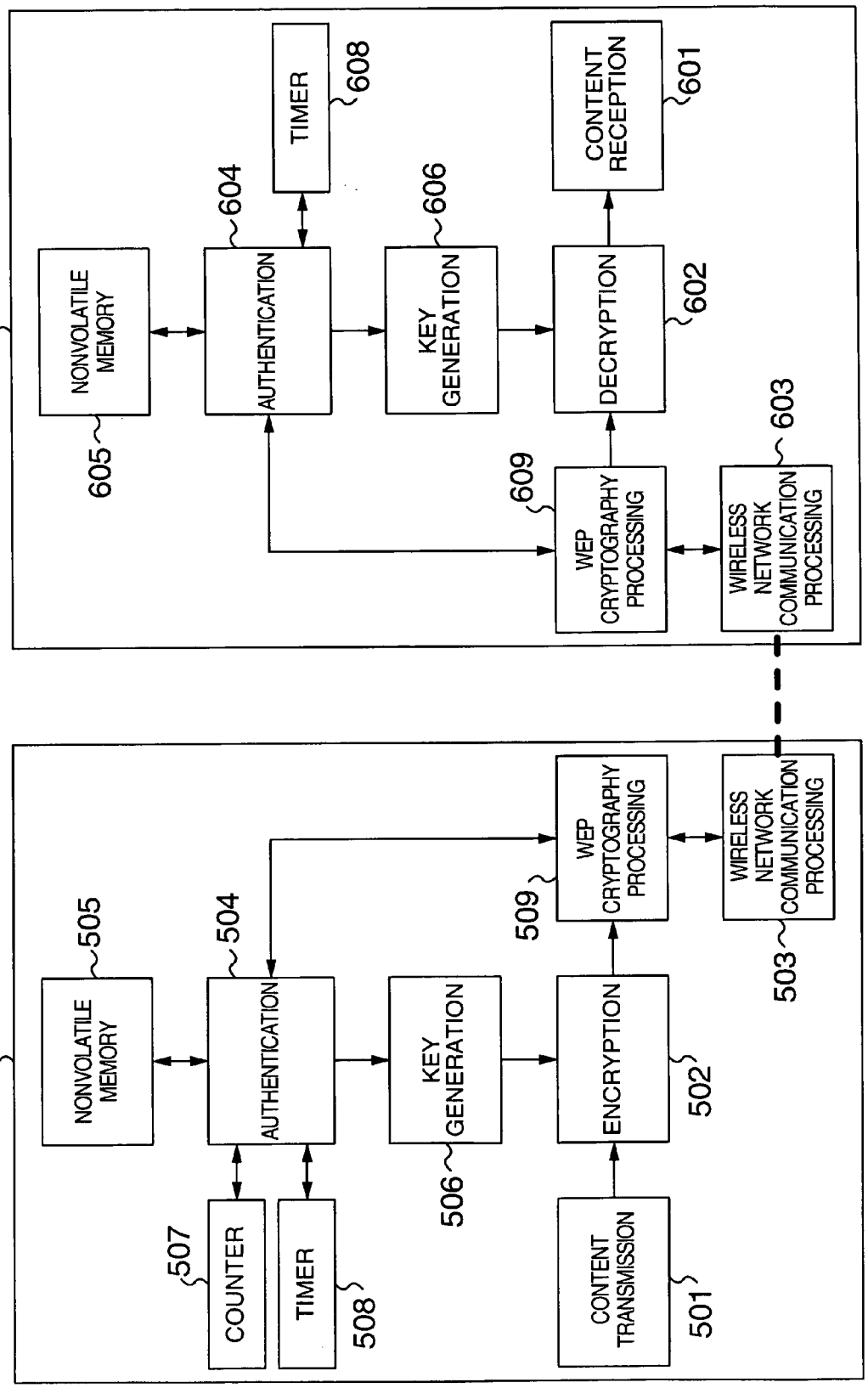
FIG. 4 is a block diagram showing the structure of a content transmitting device and a content receiving device according to a second embodiment of the present invention.

FIG. 4 shows the structure of a content transmitting device 500 and a content receiving device 600 according to a second embodiment of the present invention. The differences of the content transmitting device 500 and the content receiving device 600 in FIG. 4 from the content transmitting device 100 and the content receiving device 20 in FIG. 1 are that a wireless LAN is used to transmit content, and that for connection to LAN, wireless network communication process circuits 503 and 603 are used and WEP (Wired Equivalent Privacy) cryptographic process circuits 509 and 609 are provided. The WEP is a well-known encryption method used as a standard security scheme for security protection in wireless LAN to realize security-protected communication between the transmitting device and the receiving device under the user's control.

Figure 5:
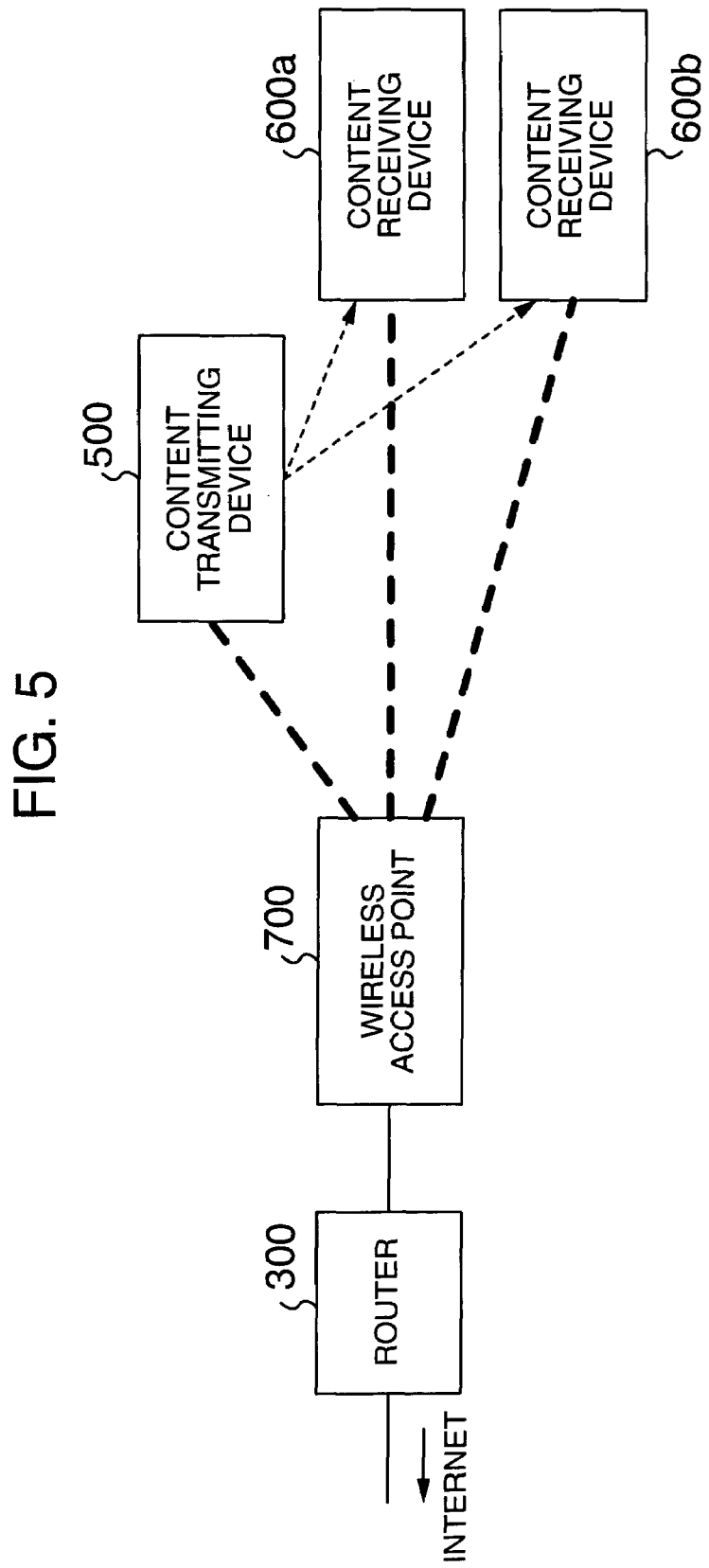
FIG. 5 is a block diagram of a LAN formed by the content transmitting device and the content receiving device according to the second embodiment of the present invention.

FIG. 5 shows a structural example of an in-house network using the content transmitting device 500 and the content receiving device 600 shown in FIG. 4. In FIG. 5, a data transmitting device 500 is connected to two data receiving devices 600a and 600b through a wireless access point 700 over a wireless LAN. The wireless LAN access point 700 is further connected to a router 300, and the router 300 is connected to the Internet like the router 300 shown in FIG. 2.

When mutual authentication is carried out and then content is transmitted between the content transmitting device 500 and the content receiving device 600 shown in FIG. 4, a check is made to see if the WEP process has been performed in the WEP cryptographic process circuits 509 and 609 by the authentication circuits 504 and 604. If not, it may be arranged that neither mutual authentication nor subsequent content transmission is carried out and that a necessary step is performed, such as urging the user to start the WEP process. By this arrangement, when content is transmitted over the wireless LAN, the devices have been set in the WEP mode without fail. Consequently, it is possible to prevent other data receiving devices from being connected somewhere over the wireless LAN which the users of the content transmitting device 500 and the content receiving device 600 are unaware of, thus eliminating chances of illegal copying of contents.

With regard to the respects other than shown above, in the same manner as described in the method of transmitting contents by the content transmitting device and the content receiving device according to the first embodiment of the present invention, it is possible to deter illegal copying of contents to thereby protect copyrights, and prevent transmission of contents from deviating from the range of personal use.

In the embodiments of the present invention described above, description has been made separately of the wired LAN and the wireless LAN; however, a LAN within a family's house can be built by using both simultaneously. To such a case, the present invention can be applied. FIG. 6 shows the structure of a LAN configured by using both a wired LAN and a wireless LAN, in which content transmitting devices and content receiving devices are used.

In FIG. 6, the content transmitting device 100 and the content receiving devices 200a and 200b are interconnected through an internet hub 400, and a wireless access point 700 is also connected to the network hub 400. The wireless access point 700 is coupled to the content transmitting device 500 and the content receiving devices 600a and 600b over a wireless LAN. The network hub is connected to the router 300 by which the in-house LAN is connected to the Internet.

The arrowed thin dotted lines in FIG. 6 indicate the directions of transmission, and contents can be transmitted between the content transmitting devices and the content receiving devices without being ware of whether the opposite party is connected through a wired LAN or a wireless LAN. The transmission procedure in this case is the same as was described referring to FIG. 3. In the content transmitting device 500 and the content receiving devices 600a and 600b using the wireless LAN, it is only necessary to make sure of the set condition of the WEP function and proceed to mutual authentication and content transmission. Also in this case, it is possible to prevent creation of illegal copies during transmission of content and restrict the transmitted content within personal use in the same way as when the LAN is built in a wired structure or a wireless structure singly.

In the above description, contents such as image information have been treated as the object transmitted over the network, but the description also applies to the kinds of information other than image information, and the present invention can be applied to transmitting and receiving devices of those kinds of information.

The authentication circuit, the key generation circuit, the encryption circuit, the counter circuit, the counter circuit, the timer circuit, etc. in the embodiments of the present invention are not limited to those realizable by hardware, but part of or the whole of them may be realized by microprocessors and software that run on the microprocessors; in fact, the effects of the present invention can be achieved either way.

For explanation's sake, the content transmitting device and the content receiving device are treated as separate objects, but with devices which record or reproduce contents on recording media, such as discs or tape, a device may be formed as a combination of the content transmitting device and the content receiving device, in which case the authentication circuit and the nonvolatile memory can be shared for two purposes.

As has been described, in the present invention, when content is transmitted over a wired or wireless LAN in the house, copy protection can be implemented to prevent illegal duplication of content, and it is possible to provide a content transmitting device, a content receiving device and a content transmitting method which can restrict legitimate listening or viewing of content and lawful creation of copies to the range of personal use.

According to the present invention, it is possible to improve the reliability of the content transmitting device, the content receiving device and content transmission using a wired or wireless LAN in the house.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A content transmitting device comprising:
   network communication process means for transmitting and receiving data via a network;
   send-content generating means for supplying said network communication process means with a content to be transmitted to a content receiving device connected via said network;
   authenticating means for receiving an authentication request from said content receiving device and authenticating said authentication request;
   encrypting means for generating key information by key information generated based on information obtained by performing an authentication process by said authenticating means, and carrying out an encryption process of a content to be transmitted to said content receiving device, by using said key information;
   timer means for measuring a time from transmission of information to said content receiving device until arrival of acknowledgement of receipt from said content receiving device,
   wherein when the time is larger than a predetermined value, said authenticating means decides that the authentication of said content receiving device is a failure, so that the transmittable range of the content is restricted to within a location or house in which said content transmitting device is placed to prohibit the transmission of the content to an outside of said location or said house, listening and viewing of the content is restricted, and copying and transmitting of the content is limited to personal use;
   wherein if said authenticating means decides that said authentication request was transmitted and received via a number of external devices in said network, where the number being more than or equal to a predetermined value, said authentication request is not accepted.

2. A method for transmitting a content between a content transmitting device and a content receiving device connected via a network, wherein in said content transmitting device, said content transmitting method comprises the steps of:
   authentication of receiving an authentication request from said content receiving device, authenticating said authentication request;
   encryption of generating key information generated based on information obtained by performing said authentication step, and performing an encryption process of a content transmitted to said content receiving device by said key information;
   measuring a transmitting-end time from transmission of information to said content receiving device until arrival of acknowledgement of receipt from said content receiving device,
   wherein in said content receiving device, the content transmitting method comprises the step of:
   authentication of issuing an authentication request to said content transmitting device, and making a pass/fail decision on the authentication of the authentication request received from said content transmitting device;
   decryption of generating key information by key information generated based on information obtained by performing said authentication process, and decrypting a content from said content transmitting device by said key information;
   measuring a receiving-end time from transmission of an authentication request to said content transmitting device or a time from when transmission of a response to the authentication request of said content transmitting device until arrival of acknowledgement of receipt from said content transmitting device,
   wherein when a measured said transmitting-end time is larger than a predetermined value, said authenticating means decides that the authentication of said content receiving device is a failure, so that the transmittable range of the content is restricted to within a location or house in which said content transmitting device is placed to prohibit the transmission of the content to an outside of said location or said house, listening and viewing of the content is restricted, and copying and transmitting of the content is limited to personal use;
   wherein if said authentication request was transmitted and received via a number of external devices in said network, where the number being more than or equal to a predetermined value, said authentication request is not accepted.

3. A content transmitting method in a content transmitting device for transmitting a content to a content receiving device connected via a network, said method comprising the steps of:
   when transmitting a content, receiving an authentication request from said content receiving device and authenticating said authentication request; and
   measuring a time from when information is transmitted to said content receiving device until arrival of acknowledgement of receipt from said content receiving device,
   wherein when a measured said time is larger than a predetermined value, said authenticating means decides that the authentication of said content receiving device is a failure, so that the transmittable range of the content is restricted to within a location or house in which said content transmitting device is placed to prohibit the transmission of the content to an outside of said location or said house, listening and viewing of the content is restricted, and copying and transmitting of the content is limited to personal use;

wherein if said authentication request was transmitted and received via a number of external devices in said network, where the number being more than or equal to a predetermined value, said authentication request is not accepted.

4. An information transmitting device comprising:

authenticating means for, when transmitting information to an information receiving device connected via a network, receiving an authentication request from said information receiving device and authenticating said authentication request; and time measuring means for measuring a time from when information is transmitted to said information receiving device until arrival of acknowledgement of receipt from said information receiving device, wherein when a measured said time is larger than a predetermined value, said authenticating means decides that the authentication of said information receiving device is a failure, so that the transmittable range of the content is restricted to within a location or house in which a content transmitting device is placed to prohibit the transmission of the content to an outside of said location or said house, listening and viewing of the content is restricted, and copying and transmitting of the content is limited to personal use;

wherein if said authenticating means decides that said authentication request was transmitted and received via a number of external devices in said network, where the number being more than or equal to a predetermined value, said authentication request is not accepted.

5. A content transmitting device according to claim 1, wherein said timer means further measures a second time from when an authentication response responding to said information from said content receiving device is transmitted from said content transmitting device until acknowledgement of receipt from said content receiving device.

6. A content transmitting device according to claim 5, wherein when said content transmitting device receives the authentication request from said content receiving device and transmits an acknowledgement of receipt to said content receiving device, said content receiving device measures a third time from when said authentication request is transmitted to said content transmitting device until acknowledgement of receipt from said content transmitting device.

7. A content transmitting device according to claim 1, wherein when said content transmitting device receives the authentication request from said content receiving device and transmits an acknowledgement of receipt to said content receiving device, said content receiving device measures a third time from when said authentication request is transmitted to said content transmitting device until acknowledgement of receipt from said content transmitting device.

8. A content transmitting method according to claim 3, wherein said step of measuring a time further including measuring of a second time from when an authentication response responding to said information from said content receiving device is transmitted from said content transmitting device until acknowledgement of receipt from said content receiving device.

9. An information transmitting device according to claim 4, wherein said timer further measures a second time from when an authentication response responding to said information from said content receiving device is transmitted from said content transmitting device until acknowledgement of receipt from said content receiving device.

10. An information transmitting device according to claim 1, wherein said network communication processor transmits and receives data by wireless communication, and said information transmitting device further comprises another encryptor for encrypting data transmitted to the content receiving device by wireless communication.

11. A method for transmitting a content according to claim 2, wherein said content transmitting device transmits and receives the content by wireless communication, and said method further comprises a step for encrypting data transmitted to the content receiving device by wireless communication.

12. A content transmitting method according to claim 3, wherein said content transmitting device transmits and receives the content by wireless communication, and said method further comprises a step for encrypting data transmitted to the content receiving device by wireless communication.

13. An information transmitting device according to claim 4, wherein said information transmitting device transmits and receives information by wireless communication, and said information transmitting device further comprises an encrypting means for encrypting data transmitted to the information receiving device by wireless communication.

* * * * *

UNITED STATES PATENT AND TRADEMARK OFFICE
CERTIFICATE OF CORRECTION

PATENT NO. : 7,644,265 B2
APPLICATION NO. : 10/770519
DATED : January 5, 2010
INVENTOR(S) : Kudo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1078 days.

Signed and Sealed this

Twenty-first Day of December, 2010

David J. Kappos
*Director of the United States Patent and Trademark Office*